(12) United States Patent
Worthington et al.

(10) Patent No.: US 7,232,986 B2
(45) Date of Patent: Jun. 19, 2007

(54) APPARATUS FOR DETECTING A POINTER WITHIN A REGION OF INTEREST

(75) Inventors: Stephen Worthington, Calgary (CA); Gerald D. Morrison, Calgary (CA); Patrick James Gurtler, Calgary (CA)

(73) Assignee: SMART Technologies Inc. (CA)

( * ) Notice: Subject to any disclaimer, the term of this patent is extended or adjusted under 35 U.S.C. 154(b) by 193 days.

(21) Appl. No.: 10/778,534

(22) Filed: Feb. 17, 2004

(65) Prior Publication Data
US 2005/0178953 A1    Aug. 18, 2005

(51) Int. Cl.
G06M 7/00    (2006.01)
G09G 5/00    (2006.01)

(52) U.S. Cl. .................. 250/221; 345/173; 345/175

(58) Field of Classification Search ........... 250/221; 345/156, 173, 175, 183, 157, 221; 178/19.05; 702/153; 341/5; 340/555, 556, 557
See application file for complete search history.

(56) References Cited

U.S. PATENT DOCUMENTS

| | | | |
|---|---|---|---|
| 3,870,834 A | 3/1975 | Yeaple | |
| 4,061,877 A | 12/1977 | Phillips | |
| 4,075,438 A | 2/1978 | Kappel | |
| 4,144,449 A | 3/1979 | Funk et al. | |
| 4,247,767 A | 1/1981 | O'Brien et al. | |
| 4,507,557 A * | 3/1985 | Tsikos ............... | 250/341.7 |
| 4,558,313 A | 12/1985 | Garwin et al. | |
| 4,597,470 A | 7/1986 | Takagi et al. | |
| 4,696,370 A | 9/1987 | Tokumo et al. | |
| 4,737,631 A | 4/1988 | Sasaki et al. | |
| 4,742,221 A | 5/1988 | Sasaki et al. | |
| 4,746,770 A * | 5/1988 | McAvinney ......... | 178/18.09 |
| 4,782,328 A | 11/1988 | Denlinger | |
| 4,818,826 A | 4/1989 | Kimura | |
| 5,097,516 A | 3/1992 | Amir | |
| 5,109,435 A | 4/1992 | Lo et al. | |
| 5,317,140 A | 5/1994 | Dunthorn | |
| 5,483,261 A | 1/1996 | Yasutake | |

(Continued)

FOREIGN PATENT DOCUMENTS

DE    198 10 452 A1    12/1998

(Continued)

OTHER PUBLICATIONS

Bud K. Funk, "CCDs in optical touch panels deliver high resolution", Electronic Design, Sep. 27, 1980, pp. 139-143.

(Continued)

Primary Examiner—Georgia Epps
Assistant Examiner—Don Williams
(74) Attorney, Agent, or Firm—Katten Muchin Rosenman LLP

(57) ABSTRACT

An apparatus for detecting a pointer within a region of interest includes at least one pair of imaging devices. The imaging devices have overlapping fields of view encompassing the region of interest. At least one light source provides illumination across the region of interest and is within the field of view of at least one of the imaging device. A filter is associated with the at least one imaging device whose field of view sees the light source. The filter blocks light projected by the light source to inhibit the imaging device from being blinded by the projected light.

44 Claims, 4 Drawing Sheets

U.S. PATENT DOCUMENTS

| | | | |
|---|---|---|---|
| 5,483,603 A | 1/1996 | Luke et al. | |
| 5,502,568 A | 3/1996 | Ogawa et al. | |
| 5,581,276 A | 12/1996 | Cipolla et al. | |
| 5,638,092 A | 6/1997 | Eng et al. | |
| 5,737,740 A | 4/1998 | Henderson et al. | |
| 5,754,664 A | 5/1998 | Clark et al. | |
| 5,825,352 A | 10/1998 | Bisset et al. | |
| 5,854,847 A | 12/1998 | Yoshida et al. | |
| 5,911,004 A | 6/1999 | Ohuchi et al. | |
| 5,936,615 A | 8/1999 | Waters | |
| 5,963,199 A | 10/1999 | Kato et al. | |
| 5,982,352 A | 11/1999 | Pryor | |
| 5,988,645 A * | 11/1999 | Downing | 273/348 |
| 6,002,808 A | 12/1999 | Freeman | |
| 6,008,798 A | 12/1999 | Mato, Jr. et al. | |
| 6,061,177 A | 5/2000 | Fujimoto | |
| 6,100,538 A * | 8/2000 | Ogawa | 250/559.29 |
| 6,161,066 A | 12/2000 | Wright et al. | |
| 6,191,773 B1 | 2/2001 | Maruno et al. | |
| 6,208,330 B1 | 3/2001 | Hasegawa et al. | |
| 6,256,033 B1 | 7/2001 | Nguyen | |
| 6,262,718 B1 | 7/2001 | Findlay et al. | |
| 6,310,610 B1 | 10/2001 | Beaton et al. | |
| 6,323,846 B1 | 11/2001 | Westerman | |
| 6,335,724 B1 | 1/2002 | Takekawa et al. | |
| 6,339,748 B1 | 1/2002 | Hiramatsu | |
| 6,353,434 B1 | 3/2002 | Akebi et al. | |
| 6,359,612 B1 | 3/2002 | Peter et al. | |
| 6,414,671 B1 | 7/2002 | Gillespie et al. | |
| 6,421,042 B1 | 7/2002 | Omura et al. | |
| 6,429,856 B1 | 8/2002 | Omura et al. | |
| 6,498,602 B1 * | 12/2002 | Ogawa | 345/173 |
| 6,507,339 B1 | 1/2003 | Tanaka | |
| 6,512,838 B1 | 1/2003 | Rafii et al. | |
| 6,531,999 B1 | 3/2003 | Trajkovic | |
| 6,559,813 B1 | 5/2003 | DeLuca et al. | |
| 6,563,491 B1 | 5/2003 | Omura | |
| 6,594,023 B1 | 7/2003 | Omura et al. | |
| 6,608,619 B2 | 8/2003 | Omura et al. | |
| 6,614,910 B1 | 9/2003 | Clemow et al. | |
| 6,626,718 B2 | 9/2003 | Hiroki | |
| 6,674,424 B1 | 1/2004 | Fujioka | |
| 6,710,770 B2 | 3/2004 | Tomasi et al. | |
| 6,731,765 B1 | 5/2004 | Sotome | |
| 6,744,898 B1 | 6/2004 | Hirano | |
| 6,774,889 B1 | 8/2004 | Zhang et al. | |
| 6,803,906 B1 | 10/2004 | Morrison et al. | |
| 6,933,981 B1 | 8/2005 | Kishida et al. | |
| 7,007,236 B2 | 2/2006 | Dempski et al. | |
| 7,030,861 B1 | 4/2006 | Westerman et al. | |
| 2001/0019325 A1 | 9/2001 | Takekawa | |
| 2001/0022579 A1 | 9/2001 | Hirabayashi | |
| 2001/0026268 A1 | 10/2001 | Ito | |
| 2001/0033274 A1 | 10/2001 | Ong | |
| 2002/0036617 A1 | 3/2002 | Pryor | |
| 2003/0001825 A1 | 1/2003 | Omura et al. | |
| 2003/0025951 A1 | 2/2003 | Pollard et al. | |
| 2003/0085871 A1 | 5/2003 | Ogawa | |
| 2003/0086572 A1 | 5/2003 | Sotome et al. | |
| 2004/0021633 A1 | 2/2004 | Rajkowski | |
| 2004/0149892 A1 * | 8/2004 | Akitt et al. | 250/221 |
| 2004/0178997 A1 | 9/2004 | Gillespie et al. | |
| 2004/0189720 A1 | 9/2004 | Wilson et al. | |
| 2005/0052427 A1 | 3/2005 | Wu et al. | |

FOREIGN PATENT DOCUMENTS

| | | |
|---|---|---|
| JP | 57-211637 | 12/1982 |
| JP | 57-211637 A | 12/1982 |
| JP | 8-240407 | 9/1996 |
| JP | 8-240407 A | 9/1996 |
| JP | 9-91094 | 4/1997 |
| JP | 9-091094 A | 4/1997 |
| JP | 9-319501 | 12/1997 |
| JP | 9-319501 A | 12/1997 |
| WO | 99/40562 | 8/1999 |

OTHER PUBLICATIONS

International Search Report with a date of mailing of Oct. 22, 2001 for PCT/CA 01/00980 with an International Filing Date of Jul. 5, 2001.

Bud K. Funk, CCDs in optical panels deliver high resolution, Electronic Design, Sep. 27, 1980, pp. 139-143.

* cited by examiner

APPARATUS FOR DETECTING A POINTER WITHIN A REGION OF INTEREST

FIELD OF THE INVENTION

The present invention relates generally to interactive systems and in particular to an apparatus for detecting a pointer within a region of interest.

BACKGROUND OF THE INVENTION

Touch systems are well known in the art and typically include a touch screen having a touch surface on which contacts are made using a pointer such as for example a pen tool, finger or other suitable object. Pointer contacts with the touch surface are detected and are used to generate output pointer position data representing areas of the touch surface where pointer contacts are made.

International PCT Application No. PCT/CA01/00980 filed on Jul. 5, 2001 and published under number WO 02/03316 on Jan. 10, 2002, assigned to SMART Technologies Inc., assignee of the present invention, discloses a passive camera-based touch system. The camera-based touch system comprises a touch screen that includes a touch surface on which a computer-generated image is presented. A rectangular bezel or frame surrounds the touch surface and supports digital cameras at its corners. The digital cameras have overlapping fields of view that encompass and look across the touch surface. The digital cameras acquire images of the touch surface from different locations and generate image data. The image data is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer location data is conveyed to a computer executing one or more application programs. The computer uses the pointer location data to update the computer-generated image that is presented on the touch surface. Pointer contacts on the touch surface can therefore be recorded as writing or drawing or used to control execution of an application program executed by the computer.

Although this camera-based touch system works extremely well, it has been found that when the digital camera frame rates are high, in less favorable light conditions, the ability to determine the existence of a pointer in the captured image data is diminished. As a result, there exists a need to improve the lighting environment for the digital cameras to ensure high resolution irrespective of ambient lighting conditions.

U.S. patent application Ser. No. 10/354,168 to Akitt et al. entitled "Illuminated Bezel And Touch System Incorporating The Same", assigned to SMART Technologies Inc., assignee of the present invention, discloses an illuminated bezel for use in the above-described camera-based touch system. The illuminated bezel projects infrared backlighting across the touch surface that is visible to the digital cameras. As a result, when no pointer is positioned within the fields of view of the digital cameras, the digital cameras see bright bands of illumination as a result of the projected backlighting. When a pointer is positioned within the fields of view of the digital cameras, the pointer occludes the backlight illumination. Therefore, in each captured image the pointer appears as a high-contrast dark region interrupting the bright band of illumination allowing the existence of the pointer in the captured image to be readily detected.

Although the illuminated bezel works very well, because the illuminated bezel completely surrounds the touch surface and makes use of an array of infrared light emitting diodes mounted on a printed circuit board that is disposed behind a diffuser, manufacturing costs are significant especially in cases where the illuminated bezel surrounds large touch surfaces. As will be appreciated, lower cost backlight illumination for touch systems of this nature is desired.

Also, although the existence of the pointer in captured images can be readily detected, currently the use of monochrome digital cameras to capture images increases costs and provides limited information concerning attributes of the pointer used to contact the touch system.

It is therefore an object of the present invention to provide a novel apparatus for detecting a pointer within a region of interest.

SUMMARY OF THE INVENTION

Accordingly, in one aspect of the present invention, there is provided an apparatus for detecting a pointer within a region of interest comprising:

at least one pair of imaging devices, said imaging devices having overlapping fields of view encompassing said region of interest;

at least one light source providing illumination across said region of interest and being within the field of view of at least one of said imaging devices; and a filter associated with the at least one imaging device whose field of view sees said light source, said filter blocking light projected by said light source to inhibit said imaging device from being blinded by said projected light.

In one embodiment, the filter blocks light having a characteristic different from a characteristic assigned to the at least one imaging device. The characteristic may be one of polarization and frequency. The apparatus may include a light source associated with each imaging device, with each light source being in the field of view of the non-associated imaging device. Light projected by each light source is visible to its associated imaging device but is blocked by the filter associated with the non-associated imaging device.

The region of interest may overlie a touch surface on which pointer contacts are made, with imaging devices and associated light sources being provided adjacent each corner of the touch surface.

According to another aspect of the present invention there is provided an apparatus for detecting a pointer within a region of interest comprising:

at least one pair of imaging devices, said imaging devices having overlapping fields of view looking generally across said region of interest;

a light source associated with each imaging device, each said light source providing illumination across said region of interest and being in the field of view of the non-associated imaging device; and a filter device associated with each imaging device so that substantially only light projected by the light source associated therewith is received by said associated imagining device.

According to still yet another aspect of the present invention there is provided an apparatus for detecting a pointer within a region of interest comprising:

an imaging device adjacent at least two corners of said region of interest, the imaging devices having overlapping fields of view looking generally across said region of interest, said imaging devices being configured to capture light having a particular characteristic; and a light source associated with each imaging device, each said light source projecting light across said region of interest having a characteristic of the type capturable by said associated imaging device.

According to still yet another aspect of the present invention there is provided an apparatus for detecting a pointer within a region of interest comprising:

at least two color imaging devices having overlapping fields of view looking generally across said region of interest;

processing circuitry receiving and processing images acquired by said imaging devices to detect the existence of a pointer in said images and to determine the location of said pointer relative to said region of interest; and at least one illumination source projecting light in a specified frequency range across said region of interest thereby to provide lighting for said imaging devices, wherein said color imaging devices are sensitive to ambient light to capture color images and are sensitive to the light projected by said at least one illumination source to capture monochrome images.

According to still yet another aspect of the present invention there is provided an apparatus for detecting a pointer contact on a generally rectangular touch surface comprising:

a color imaging device at each corner of said touch surface and having a field of view looking generally across said touch surface;

processing circuitry receiving and processing images acquired by said imaging devices to detect the existence of a pointer in said images and to determine the location of said pointer relative to said region of interest; and illumination sources surrounding said touch surface and projecting light in a specified frequency range across said touch surface thereby to provide backlighting for said imaging devices, wherein said color imaging devices are sensitive to ambient light to capture color images and are sensitive to the light projected by said illumination sources to capture monochrome images.

According to still yet another aspect of the present invention there is provided an apparatus for detecting a pointer within a region of interest comprising:

at least two monochrome imaging devices having overlapping fields of view looking generally across said region of interest;

processing circuitry receiving and processing images acquired by said imaging devices to detect the existence of a pointer in said images and to determine the location of said pointer relative to said region of interest; and at least one illumination source projecting light across said region of interest; and at least one filter changing the frequency band of light in a cycle thereby to enable said imaging devices to capture images looking across said region of interest in different lighting conditions.

The present invention provides advantages in that in one embodiment, backlight illumination is provided across the touch surface in an effective and cost efficient manner. The present invention provides further advantages in that since images looking across the region of interest can be acquired at different frequency bands of light, in addition to determining the location of the pointer, increased pointer attribute information can be easily obtained.

BRIEF DESCRIPTION OF THE DRAWINGS

Embodiments of the present invention will now be described more fully with reference to the accompanying drawings in which.

DETAILED DESCRIPTION OF THE INVENTION

Figure 1:
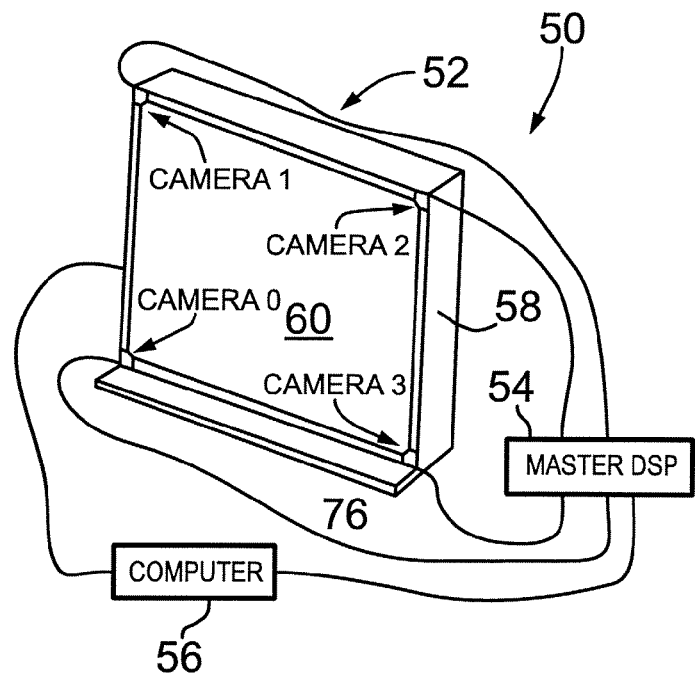
FIG. 1 is a schematic diagram of an apparatus for detecting a pointer within a region of interest.
Figure 2:
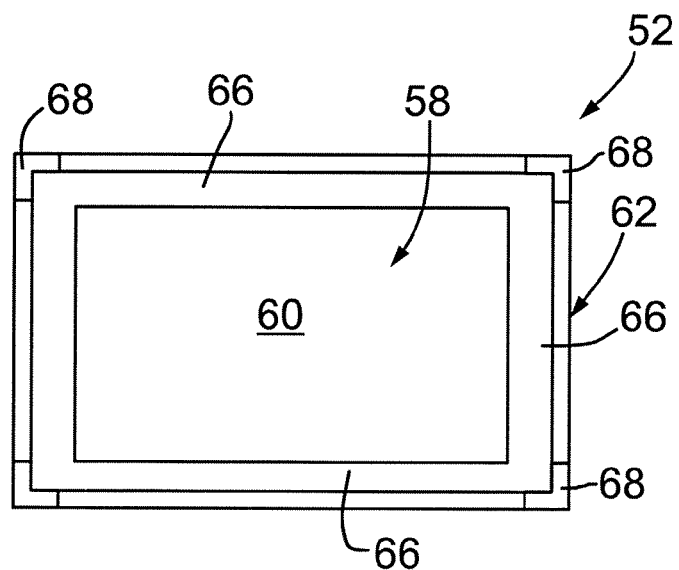
FIG. 2 is a front elevation view of a touch screen forming part of the apparatus of FIG. 1.
Figure 3:
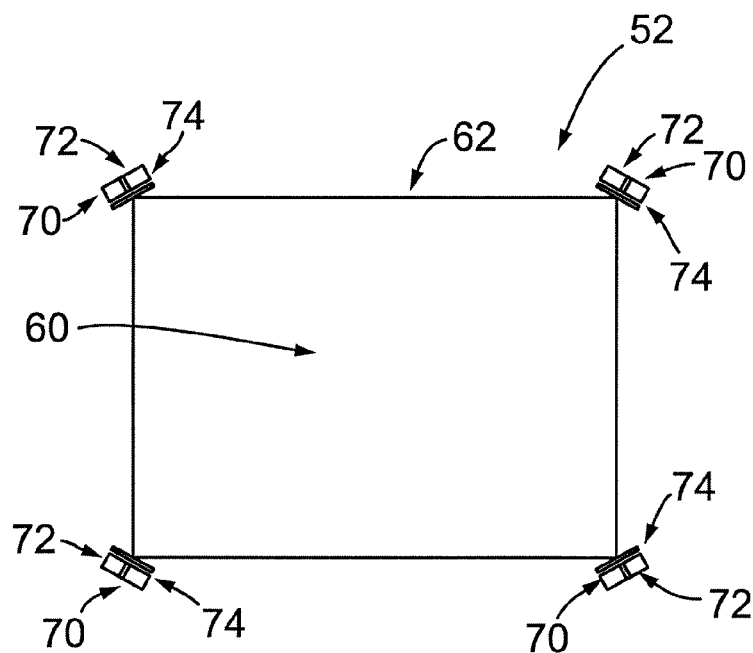
FIG. 3 is another front elevation view of the touch screen of FIG. 2.

Turning now to FIGS. 1 to 3, an apparatus for detecting a pointer within a region of interest in accordance with the present invention is shown and is generally identified by reference numeral 50. In this embodiment, apparatus 50 is a camera-based touch system similar to that disclosed in International PCT Application Serial No. WO 02/03316, assigned to SMART Technologies Inc., assignee of the present invention, the content of which is incorporated herein by reference. As can be seen, touch system 50 includes a touch screen 52 coupled to a digital signal processor (DSP) based master controller 54. Master controller 54 is also coupled to a computer 56. Computer 56 executes one or more application programs and generates computer-generated image output that is presented on the touch screen 52. The touch screen 52, master controller 54 and computer 56 form a closed-loop so that pointer contacts made on the touch screen 52 can be recorded as writing or drawing or used to control execution of an application programs executed by the computer 56.

FIGS. 2 and 3 better illustrate the touch screen 52. Touch screen 52 in the present embodiment includes a high-resolution display device such as a plasma display 58, the front surface of which defines a touch surface 60. The touch surface 60 is bordered by a bezel or frame 62 coupled to the display device. Corner pieces 68 that house DSP-based CMOS digital cameras 70 are located at each corner of the bezel 62. Each digital camera 70 is mounted within its respective corner piece 68 so that its field of view encompasses and looks generally across the entire plane of the touch surface 60.

An infrared light source 72 is associated with and positioned adjacent each digital camera 70. Each light source 72 includes an array of infrared (IR) light emitting diodes (LEDs). The light emitting diodes project infrared lighting across the touch surface 60.

Polarizers 74 are provided in front of the digital cameras 70 and the infrared light sources 72. The polarization of the polarizers 74 at opposite corners of the touch surface 60 have opposite polarization. For example, in this embodiment, the polarizers 74 at the top and bottom left corners of the touch surface 60 have a vertical orientation and the polarizers 74 at the top and bottom right corners of the touch surface 60 have a horizontal orientation. In this manner, the polarizers 74 minimize the light projected by the diagonally opposite infrared light sources 72 that is seen by the digital cameras 70 i.e. block the diagonally opposite infrared light sources 72 from their fields of view thereby to avoid digital camera photo-saturation and other effects that reduce the effectiveness of the digital cameras 70.

Figure 4:
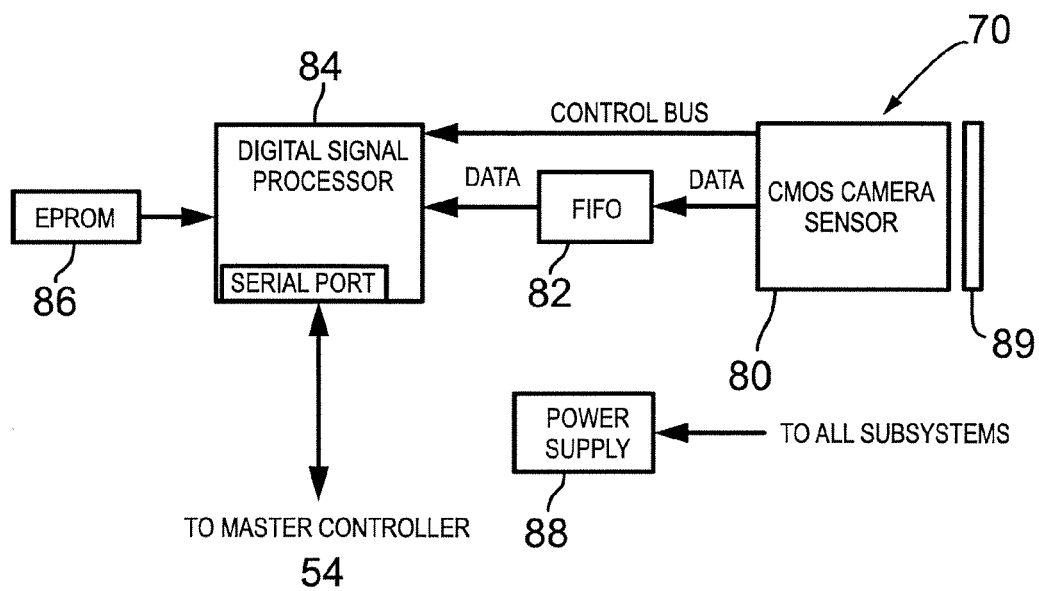
FIG. 4 is a schematic diagram of a digital camera forming part of the touch screen of FIG. 2.

One of the digital cameras 70 within a corner piece 68 is shown in FIG. 4. As can be seen, the digital camera 70 includes a two-dimensional CMOS image sensor and associated lens assembly 80, a first-in-first-out (FIFO) buffer 82 coupled to the image sensor and lens assembly 80 by a data bus and a digital signal processor (DSP) 84 coupled to the FIFO 82 by a data bus and to the image sensor and lens assembly 80 by a control bus. A boot EPROM 86 and a power supply subsystem 88 are also included. In the present embodiment, the CMOS camera image sensor is configured for a 20×640 pixel subarray that can be operated to capture image frames at high frame rates in excess of 200 frames per second since arbitrary pixel rows can be selected. Also, since the pixel rows can be arbitrarily selected, the pixel subarray can be exposed for a greater duration for a given digital camera frame rate allowing for good operation in dark rooms as well as well lit rooms.

The DSP 84 provides control information to the image sensor and lens assembly 80 via the control bus. The control information allows the DSP 84 to control parameters of the image sensor and lens assembly 80 such as exposure, gain, array configuration, reset and initialization. The DSP 84 also provides clock signals to the image sensor and lens assembly 80 to control the frame rate of the image sensor and lens assembly 80.

An infrared pass filter 89 is provided on the image sensor and lens assembly 80 to blind the digital camera 70 to frequencies of light outside the infrared range.

Figure 5:
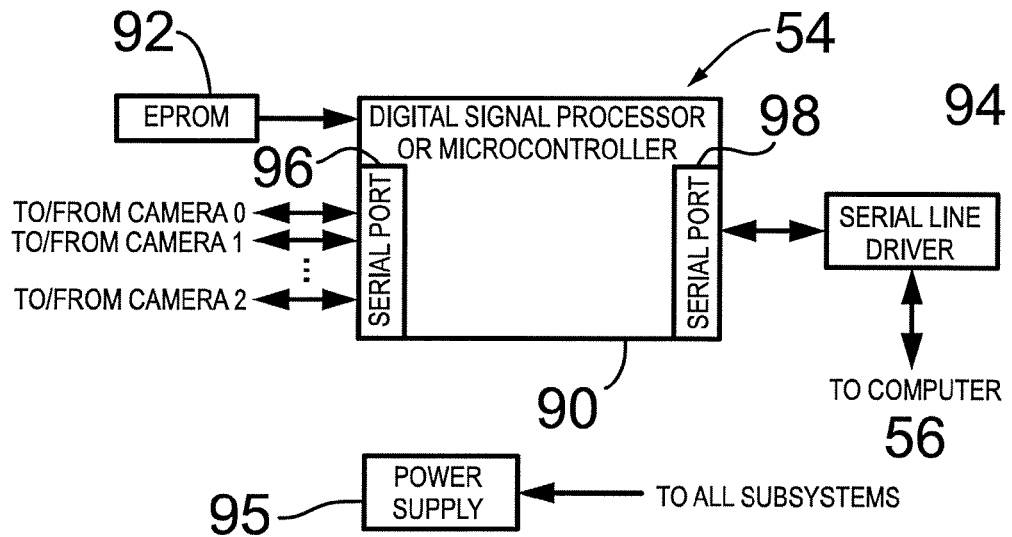
FIG. 5 is a schematic diagram of a master controller forming part of the apparatus of FIG. 1.

Master controller 54 is better illustrated in FIG. 5 and includes a DSP 90, a boot EPROM 92, a serial line driver 94 and a power supply subsystem 95. The DSP 90 communicates with the DSPs 84 of the digital cameras 70 over a data bus via a serial port 96 and communicates with the computer 56 over a data bus via a serial port 98 and the serial line driver 94.

The master controller 54 and each digital camera 70 follow a communication protocol that enables bidirectional communications via a common serial cable similar to a universal serial bus (USB). Communications between the master controller 54 and the digital cameras 70 are performed as background processes in response to interrupts.

The operation of the touch system 50 will now be described. To provide appropriate lighting for the digital cameras 70, the infrared light source 72 associated with each digital camera 70 generates infrared light that is projected across the touch surface 60 covering an area at least as large as the field of view of the associated digital camera.

As mentioned previously, the polarizers 74 at opposite diagonal corners of the touch surface 60 inhibit the infrared light source 72 diagonally opposite each digital camera 70 from blinding that digital camera due to the different polarization orientations of the polarizers 74. Infrared light impinging on a polarizer 74 that is polarized in a manner different from the polarization orientation of the polarizer is blocked. In this manner, the digital camera 70 behind each polarizer 74 in effect does not see the infrared light source 72 at the diagonally opposite corner.

Each digital camera 70 acquires images looking across the touch surface 60 within the field of view of its image sensor and lens assembly 80 at a desired frame rate and processes each acquired image to determine if a pointer is in the acquired image. When a pointer is positioned within the fields of view of the digital cameras 70, the pointer is illuminated by the light projected by the infrared light sources 72. Light reflecting off of the pointer typically does not maintain its polarization and therefore is visible to the digital cameras 70. Therefore, the illuminated pointer appears as a high-contrast bright region interrupting a dark band in each captured image allowing the existence of the pointer in the captured images to be readily detected.

If a pointer is in the acquired image, the image is further processed to determine characteristics of the pointer contacting or hovering above the touch surface 60. Pointer information packets (PIPs) including pointer characteristics, status and/or diagnostic information are then generated by the digital cameras 70 and the PIPs are queued for transmission to the master controller 54.

The master controller 54 polls the digital cameras 70 for PIPs. If the PIPs include pointer characteristic information, the master controller 54 triangulates pointer characteristics in the PIPs to determine the position of the pointer relative to the touch surface 60 in Cartesian rectangular coordinates. The master controller 54 in turn transmits calculated pointer position data, status and/or diagnostic information to the computer 56. In this manner, the pointer position data transmitted to the computer 56 can be recorded as writing or drawing or can be used to control execution of an applications program executed by the computer 56. The computer 56 also updates the computer-generated image output conveyed to the plasma display 58 so that information presented on the touch surface 60 reflects the pointer activity.

Specifics concerning the processing of acquired images and the triangulation of pointer characteristics in PIPs are described in U.S. patent application Ser. No. 10/294,917 to Morrison et al., assigned to SMART Technologies Inc., assignee of the present invention, the content of which is incorporated herein by reference. Accordingly, specifics will not be described further herein.

As will be appreciated, the use of infrared light sources 72 and polarizers 74 at the corners of the touch surface 60 inhibit light sources in the fields of view of the digital cameras from blinding the digital cameras.

Figure 6:
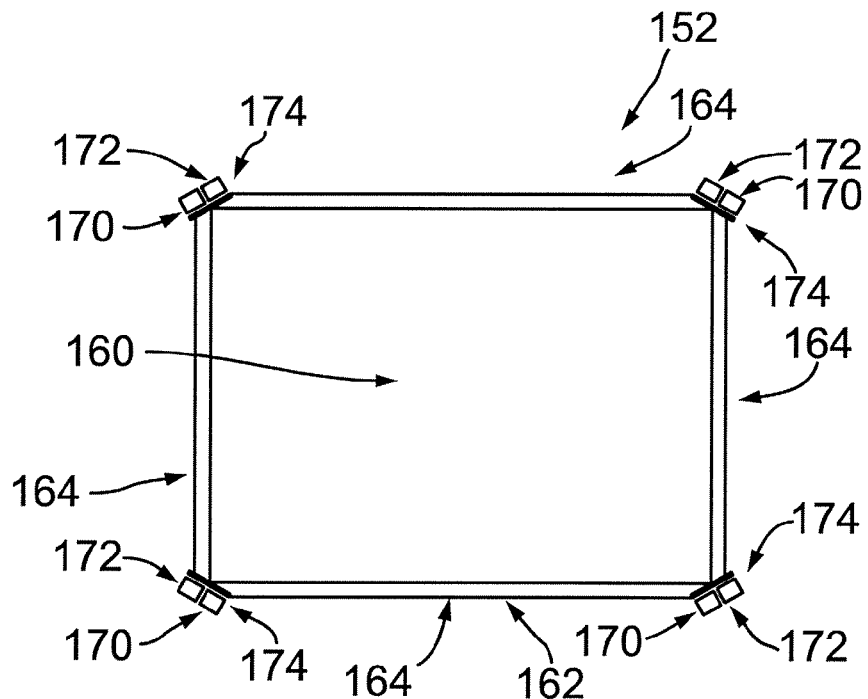
FIG. 6 is a front elevational view of an alternative embodiment of the touch screen.

Turning now to FIG. 6, another embodiment of a touch screen is shown and is generally identified by reference numeral 152. Touch screen 152 is similar to that of the previous embodiment but in this case the bezel 162 is designed to allow the touch screen 152 to operate in an occlusion mode. As can be seen, bezel 162, in this embodiment, includes elongate retro-reflectors 164 bordering the sides of the touch surface 160. The retro-reflectors 164 have retro-reflecting surfaces 166 lying in planes that are generally normal to the plane of the touch surface 160.

The retro-reflectors 164 are designed to maintain polarization of light impinging thereon. In the present embodiment, corner cube retroreflectors such as those manufactured by Reflexite Corporation and sold under the name Reflexite™ AP1000 that preserve polarization are used.

In this embodiment, when infrared light generated by the infrared light sources 172 travels across the touch surface and impinges on one or more retro-reflectors 164, the retro-reflectors 164 in turn reflect the infrared light back in the opposite direction while maintaining the polarization of the infrared light. Since the infrared light sources 172 are mounted adjacent the digital cameras 170, infrared light reflected by the retro-reflectors 164 is aimed back towards the digital cameras 170. As a result, each digital camera 170 sees a bright band of illumination within its field of view.

During image acquisition, when no pointer is positioned within the fields of view of the digital cameras 170, the digital cameras 170 see bright bands of illumination. When a pointer is positioned within the fields of view of the digital cameras 170, the pointer occludes the infrared illumination and therefore appears as a high-contrast dark region interrupting a bright band of illumination in each captured image allowing the existence of the pointer in the captured images to be readily detected.

The embodiments of the touch screen described above show digital cameras, infrared light sources and polarizers at each corner of the touch screen. Those of skill in the art will appreciate that only two imaging devices having overlapping fields of view are required. Also the infrared light sources need not be positioned adjacent the digital cameras. In addition other types of filters may be used to inhibit the digital cameras from being blinded by a light source within its field of view. Basically any filter type device that blocks light projected by a light source within the field of view of the digital camera based on a characteristic (i.e. polarization, frequency etc.) of the projected light may be used.

In addition, although each light source is described as including an array of IR LEDs, those of skill in the art will appreciate that other light source configurations to provide light illumination across the touch surface can be used.

Although the touch system 50 has been described as including a plasma display 58 to present images on the touch surface, those of skill in the art will appreciate that this is not required. The touch screen may be a rear or front projection display device or virtually any surface on which a computer generated image is projected. Alternatively, the touch system 50 may be a writeboard where images are not projected on the touch surface.

Also, although the touch system 50 is described as including a master controller 54 separate from the digital cameras, if desired one of the digital cameras can be conditioned to function as both a camera and the master controller and poll the other digital cameras for PIPs. In this case, the digital camera functioning as the master controller may include a faster DSP 84 than the remaining digital cameras.

Figure 7:
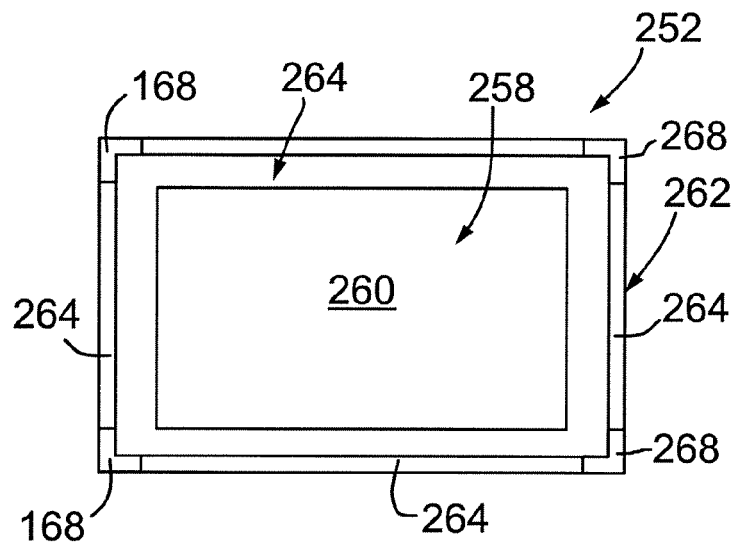
FIG. 7 is a front elevational view of yet another embodiment of the touch screen.

Turning now to FIG. 7, yet another embodiment of a touch screen is shown and is generally identified by reference numeral 252. In this embodiment, touch screen 252 includes a high-resolution display device such as a plasma display 258, the front surface of which defines a touch surface 260. The touch surface 260 is bordered by an illuminated bezel or frame 262 coupled to the display device. Illuminated bezel 262 is of the type disclosed in U.S. patent application Ser. No. 10/354,168 to Akitt et al., assigned to SMART Technologies Inc., assignee of the present invention, the content of which is incorporated by reference. Illuminated bezel 262 includes elongate side frame assemblies 264 that are coupled to the sides of the plasma display 258. Each side frame assembly 264 accommodates a generally continuous infrared illumination source 266. The ends of the side frame assemblies 264 are joined by corner pieces 268 that house DSP-based CMOS digital cameras 270. Each digital camera 270 is mounted within its respective corner piece 268 so that its field of view encompasses and looks generally across the entire touch surface 260.

Each illuminated bezel 262 includes an array of IR LEDs (not shown) that project light onto a diffuser (not shown). The diffuser in turn, diffuses and expands the infrared light emitted by the IR LEDs so that adequate infrared backlighting is projected across the touch surface 260. As a result, the illuminated bezels 162 appear as generally continuous bright bands of illumination to the digital cameras 270.

Figure 8:
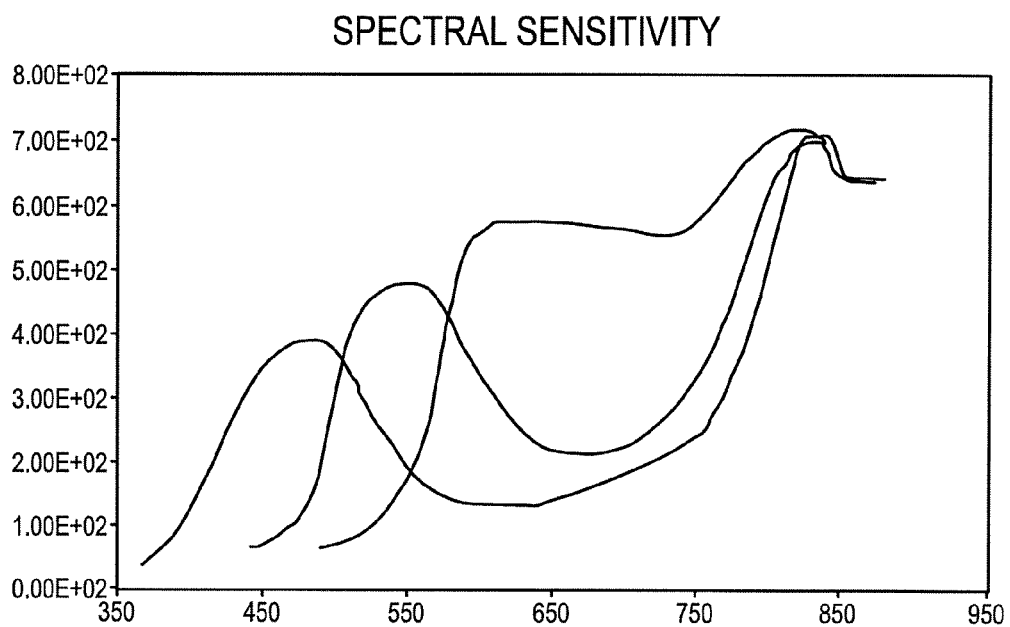
FIG. 8 is a graph showing the light sensitivity of digital cameras used in the touch screen of FIG. 7.

Rather than using monochrome digital cameras capturing infrared images, in this embodiment, the image sensors used in the digital cameras 270 are color CMOS image sensors and do not include IR pass filters. FIG. 8 shows the light sensitivity of one of the image sensors. As can be seen, the sensitivity of the image sensor to red, green and blue light is localized around the appropriate frequencies. However at light in the infrared range i.e. about 850 nm, the color filters of the image sensors become transparent making the sensitivity of all of the pixels of the image sensors basically equal. This characteristic of the image sensor allows the touch screen to be operated in a number of modes depending on ambient light levels as will now be described.

For example, in one mode of operation when the ambient light level is sufficiently high, the illuminated bezels 262 are switched off allowing color images to be acquired by the digital cameras 270. During image processing, in addition to determining the pointer position in the manner described previously, acquired color information is used to enhance pointer recognition and scene understanding.

As will be appreciated, when an image including a pointer is captured, the foreground object i.e. the pointer, is the object of interest. During image processing, it is desired to separate the foreground object from the background. Since the optical properties of the foreground object and background are different for different wavelengths of light, the foreground object is detected easier in some light frequencies than others. For example, if the background is predominantly blue, then the foreground object such as a finger will have higher luminosity when looking through red or green filters since the blue filter does not permit blue light to pass. This effectively segments the foreground object from the background. In general, the luminosity differences between the foreground object and the background are exploited at different frequencies.

When the ambient light level drops below a threshold level, the illuminated bezels 262 are switched on. In this case, the touch screen 252 operates in an occlusion mode as described previously. Pointer data is developed from images captured by the image sensors and processed in the manner discussed above.

Although the touch screen 252 has been described as using infrared illumination to provide backlighting, those of skill in the art will appreciate that light in a different frequency range other than infrared may be used provided the image sensors in the digital cameras have sufficient quantum efficiency at that different frequency range to capture images.

Rather than exclusively using ambient light when the ambient light level is sufficiently high and infrared illumination when the ambient light level is low, infrared illumination can be multiplexed with ambient light to enable the digital cameras 270 to capture different types of images. For example, the illuminated bezels 262 can be strobed so that one or more images are captured by the digital cameras 270 in ambient light conditions and then in infrared backlighting conditions. The strobing may be achieved by shutting the illuminated bezels 262 on and off and relying on ambient light levels in the off condition.

Alternatively, rather than using colour image sensors, monochrome sensors may be used in conjunction with an illumination source that provides lighting across the touch surface that changes frequency bands allowing one or more images to be captured by the digital cameras in the different frequency bands. For example, the illumination source may include a white light source and a light filter in the form of a wheel that is rotatable in front of the light source. The wheel may include alternating infrared and clear sections. When a clear section is presented in front of the light source, white light is projected across the touch surface and when an infrared section is presented in front of the light source, infrared light is projected across the touch surface.

Other light filters can of course be used with the wheel. For example, the wheel may include infrared, blue, red and green sections arranged about the wheel. Depending on the section of the wheel positioned in front of the light source, light in a different frequency band is projected across the touch surface allowing one or more images to be captured during each type of illumination. Of course, those of skill in the art will appreciate that colour wheels may be disposed in front of the digital cameras rather than adjacent the light source.

Although embodiments of the present invention have been described, those of skill in the art will appreciate that variations and modifications may be made without departing from the spirit and scope thereof as defined by the appended claims.

What is claimed is:

1. An apparatus for detecting a pointer within a region of interest comprising:
   at least one pair of imaging devices, said imaging devices having overlapping fields of view encompassing said region of interest;
   at least one light source providing illumination across said region of interest and being within the field of view of at least one of said imaging devices; and
   an optical filter associated with the at least one imaging device whose field of view sees said light source, said filter blocking light projected by said light source to inhibit said imaging device from being blinded by said projected light.

2. An apparatus according to claim 1 wherein said filter blocks light having a characteristic different from a characteristic assigned to the at least one imaging device.

3. An apparatus according to claim 2 wherein said characteristic includes at least one of polarization and frequency.

4. An apparatus according to claim 2 including a light source associated with each imaging device, each light source being in the field of view of the non-associated imaging device, light projected by each light source being visible to said associated imaging device and being blocked by a filter associated with the non-associated imaging device.

5. An apparatus according to claim 4 wherein said characteristic includes at least one of polarization and frequency.

6. An apparatus according to claim 5 wherein the light source associated with one imaging device projects illumination having a first polarization orientation and wherein the light source associated with the other imaging device projects illumination having a second polarization orientation.

7. An apparatus according to claim 6 wherein the first and second polarization orientations are vertical and horizontal polarization orientations.

8. An apparatus according to claim 2 wherein said region of interest overlies a touch surface on which pointer contacts are made.

9. An apparatus according to claim 8 wherein said touch surface and region of interest are rectangular.

10. An apparatus according to claim 9 including a light source associated with each imaging device, each light source being in the field of view of the non-associated imaging device, light projected by each light source being visible to said associated imaging device and being blocked by an optical filter associated with the non-associated imaging device.

11. An apparatus according to claim 10 wherein said characteristic includes at least one of polarization and frequency.

12. An apparatus according to claim 11 wherein the light source associated with one imaging device projects illumination having a first polarization orientation and wherein the light source associated with the other imaging device projects illumination having a second polarization orientation.

13. An apparatus according to claim 12 wherein the first and second polarization orientations are vertical and horizontal polarization orientations.

14. An apparatus for detecting a pointer within a region of interest comprising:
   at least one pair of imaging devices, said imaging devices having overlapping fields of view looking generally across said region of interest;
   a light source associated with each imaging device, each said light source providing illumination across said region of interest and being in the field of view of the non-associated imaging device;
   an optical filter device associated with each imaging device so that substantially only light projected by the light source associated therewith is received by said associated imaging device to avoid the imaging device from being blinded by other light; and
   a filter device associated with each light source to alter a characteristic of projected light such that the projected light is unable to pass through the filter device associated with the non-associated imaging device.

15. An apparatus according to claim 14 wherein said filter devices are polarizers.

16. An apparatus according to claim 15 wherein each light source is an infrared light source.

17. An apparatus according to claim 16 wherein each infrared light source includes at least one infrared light emitting diode (IR LED).

18. An apparatus according to claim 14 further comprising:
   retro-reflective elements bordering said region of interest, said retro-reflective elements returning light impinging thereon in the direction of impingement without altering the polarization thereof.

19. An apparatus according to claim 14 wherein said region of interest overlies a touch surface on which pointer contacts are made.

20. An apparatus according to claim 19 wherein said touch surface and region of interest are rectangular.

21. An apparatus according to claim 20 wherein said filter devices are polarizers.

22. An apparatus according to claim 21 including an imaging device and associated light source at each corner of said region of interest, diagonally opposite imaging devices being aimed generally at one another.

23. An apparatus according to claim 22 wherein one of the diagonally opposite polarizers has a vertical orientation and wherein the other of the diagonally opposite polarizers has a horizontal orientation.

24. An apparatus for detecting a pointer within a region of interest comprising:
   an imaging device adjacent at least two corners of said region of interest, the imaging devices having overlapping fields of view looking generally across said region of interest from different viewpoints, each imaging device having a different optical filter associated therewith so that each imaging device substantially only captures light having a particular characteristic thereby to avoid being blinded by light not having said particular characteristic; and a light source associated with each imaging device, each said light source projecting light across said region of interest having a particular characteristic such that the projected light only passes through the optical filter of said associated imaging device.

25. An apparatus according to claim 24 wherein each light source is an infrared light source.

26. An apparatus according to claim 25 wherein each infrared light source includes at least one infrared light emitting diode (IR LED).

27. An apparatus according to claim 24 wherein said region of interest overlies a touch surface on which pointer contacts are made.

28. An apparatus according to claim 27 wherein said touch surface and region of interest are rectangular.

29. An apparatus according to claim 28 wherein said imaging devices are configured to capture light having different polarizations.

30. An apparatus according to claim 29 wherein said different polarizations are vertical and horizontal.

31. An apparatus for detecting a pointer within a region of interest comprising:

at least two color imaging devices having overlapping fields of view looking generally across said region of interest;

processing circuitry receiving and processing images acquired by said imaging devices to determine the location of said pointer relative to said region of interest; and at least one illumination source projecting light in a specified frequency range across said region of interest thereby to provide lighting for said imaging devices, wherein said color imaging devices are sensitive to ambient light to capture color images and are sensitive to the light projected by said at least one illumination source to capture monochrome images.

32. An apparatus according to claim 31 wherein said illumination source is operated to project light when ambient light levels fall below a threshold level.

33. An apparatus according to claim 32 wherein said illumination source projects light in the infrared range.

34. An apparatus according to claim 31 said illumination source projects light in the infrared range.

35. An apparatus according to claim 34 wherein said region of interest overlies a touch surface.

36. An apparatus according to claim 35 wherein said illumination source is operated to project light when ambient light levels fall below a threshold level.

37. An apparatus according to claim 31 wherein said region of interest overlies a touch surface.

38. An apparatus for detecting a pointer contact on a generally rectangular touch surface comprising:

a color imaging device at each corner of said touch surface and having a field of view looking generally across said touch surface;

processing circuitry receiving and processing images acquired by said imaging devices to determine the location of said pointer relative to said region of interest; and illumination sources surrounding said touch surface and projecting light in a specified frequency range across said touch surface thereby to provide backlighting for said imaging devices, wherein said color imaging devices are sensitive to ambient light to capture color images and are sensitive to the light projected by said illumination sources to capture monochrome images.

39. An apparatus according to claim 38 wherein said illumination sources are operated to project light when ambient light levels fall below a threshold level.

40. An apparatus according to claim 39 wherein said illumination sources project light in the infrared range.

41. An apparatus for detecting a pointer within a region of interest comprising:

at least two monochrome imaging devices having overlapping fields of view looking generally across said region of interest;

processing circuitry receiving and processing images acquired by said imaging devices to determine the location of said pointer relative to said region of interest;

at least one illumination source projecting light across said region of interest; and at least one filter changing the frequency band of light in a cycle thereby to enable said imaging devices to capture images looking across said region of interest in different lighting conditions.

42. An apparatus according to claim 41 wherein said illumination source projects light of different frequencies across said region of interest in a repeating cycle.

43. An apparatus according to claim 42 wherein said illumination source projects infrared, red, blue, and green light in a cycle across said region of interest.

44. An apparatus for detecting a pointer within a region of interest comprising:

at least one pair of imaging devices, said imaging devices having overlapping fields of view looking generally across said region of interest;

a light source associated with each imaging device, each said light source providing illumination across said region of interest and being in the field of view of the non-associated imaging device; and a different optical filter device associated with each imaging device so that substantially only light projected by the light source associated therewith is received by said associated imaging device to avoid the imaging device from being blinded by other light.

* * * * *